United States Patent [19]
Johnson

[11] Patent Number: 5,024,036
[45] Date of Patent: Jun. 18, 1991

[54] INTERLOCKING SUPPORT STRUCTURES

[76] Inventor: David W. Johnson, 1884 Sunset Blvd., San Diego, Calif. 92103

[21] Appl. No.: 541,547

[22] Filed: Jun. 21, 1990

Related U.S. Application Data

[63] Continuation-in-part of Ser. No. 231,379, Aug. 12, 1988.

[51] Int. Cl.$^5$ .......................................... E04H 12/18
[52] U.S. Cl. ...................................... 52/600; 52/646; 52/DIG. 10; 405/262; 405/272
[58] Field of Search ......... 52/648, 646, 233, DIG. 10; 446/106; 405/262, 272

[56] References Cited

U.S. PATENT DOCUMENTS

| | | | |
|---|---|---|---|
| 2,001,215 | 5/1935 | Ruppel | 52/655 |
| 2,005,921 | 6/1935 | Reither | 52/233 |
| 2,110,787 | 3/1938 | Brandjord | 52/233 |
| 2,130,231 | 9/1938 | Forciea | 52/233 |
| 2,712,199 | 7/1955 | Latimer | 446/106 |
| 4,282,619 | 8/1981 | Rooney | 52/648 |
| 4,715,503 | 12/1987 | Johnson | 211/74 |
| 4,809,146 | 2/1989 | Johnson | 362/367 |
| 4,825,620 | 5/1989 | Johnson | 52/646 |
| 4,910,932 | 3/1990 | Honigman | 52/648 |

FOREIGN PATENT DOCUMENTS

| | | | |
|---|---|---|---|
| 918882 | 1/1973 | Canada | 52/233 |
| 478968 | 1/1916 | France | 52/263 |
| 647330 | 12/1950 | United Kingdom | 52/646 |

*Primary Examiner*—Henry E. Raduazo
*Attorney, Agent, or Firm*—Ralph S. Branscomb

[57] ABSTRACT

A multi-cellular, multi-purpose lattice is constructed from a matrix of elongated members which interdect at 3-dimensional joints at which the members interlock to define a completely rigid joint without the use of fasteners or adhesives. Specific implementations of the invention include an equipment support structure and a bridge. Other refinements to the basic lattice construction include diagonal braces, the narrowing of the elongated members between joints for weight considerations, the radiused treatment of member edges and notches, and other details of construction.

37 Claims, 7 Drawing Sheets

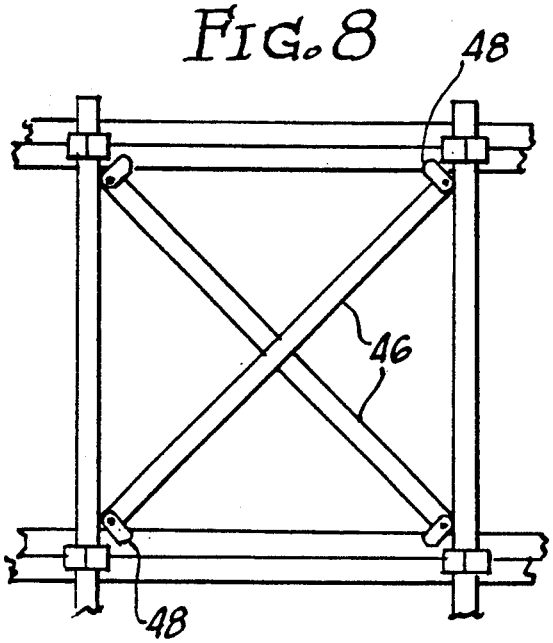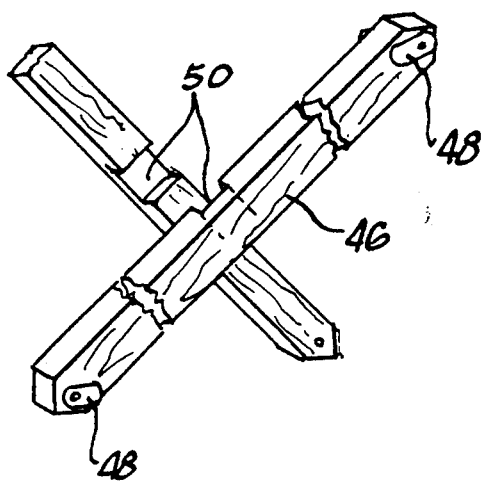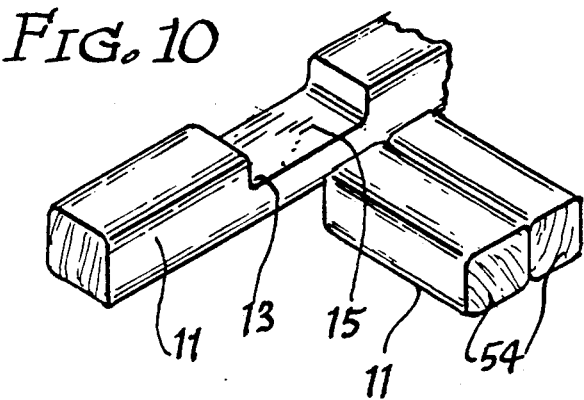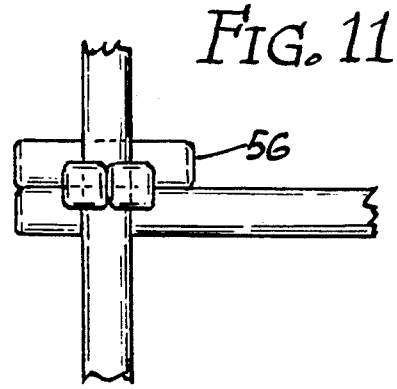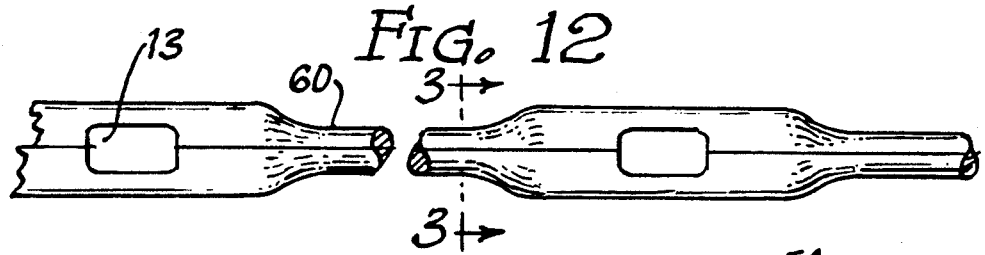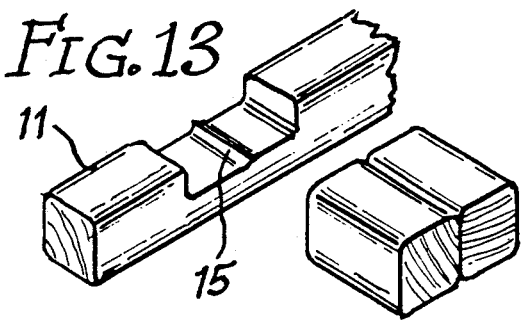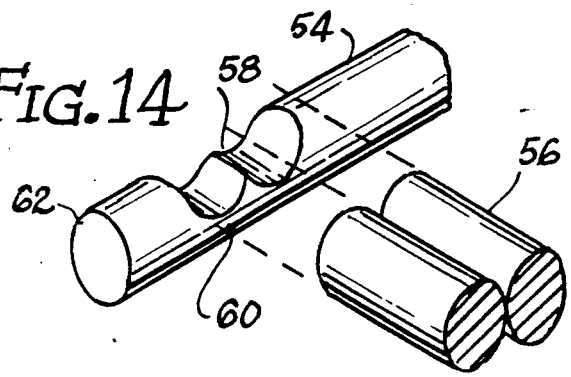

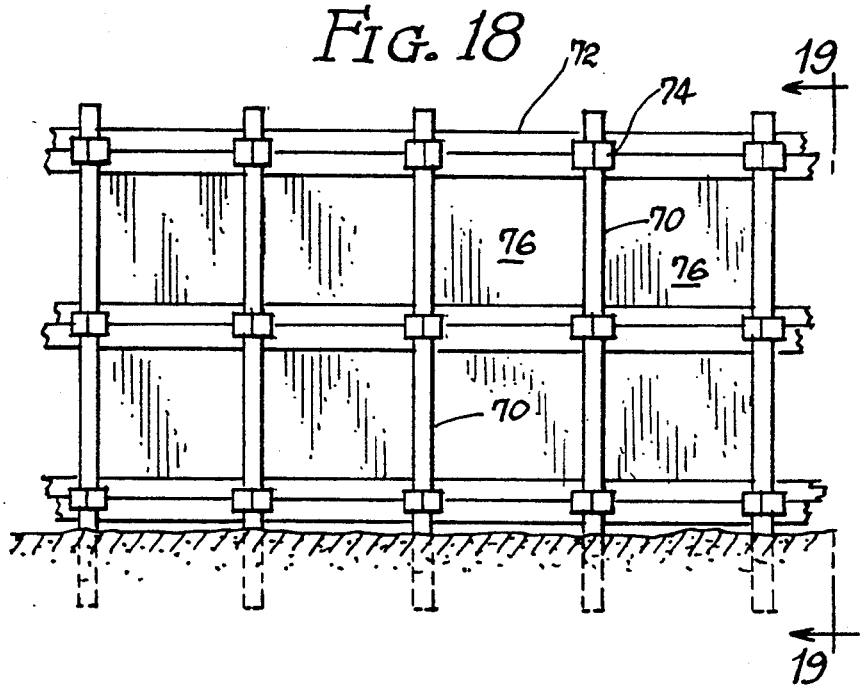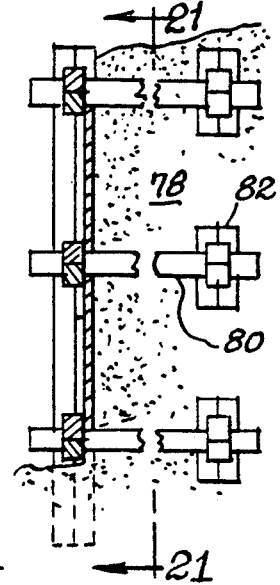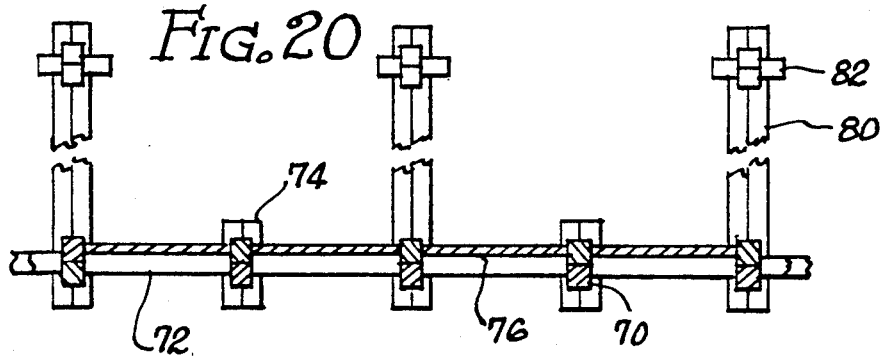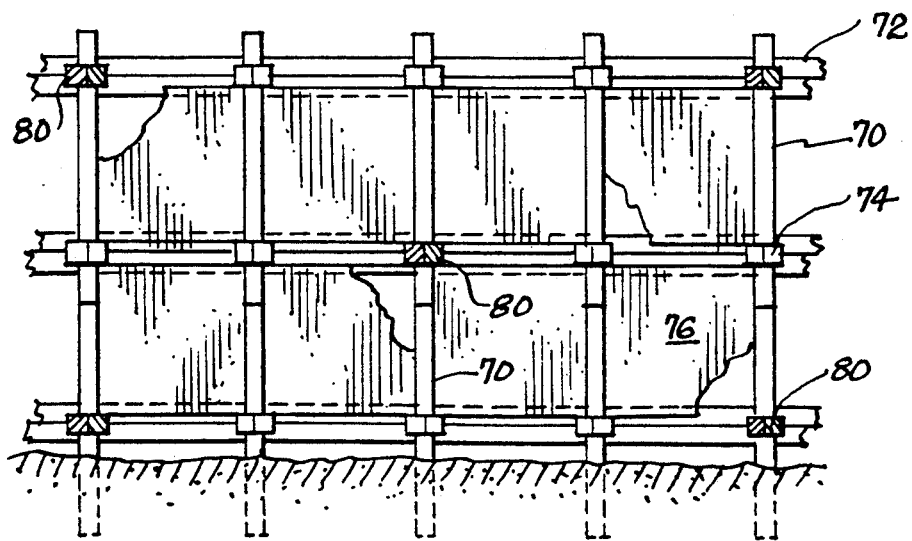

INTERLOCKING SUPPORT STRUCTURES

BACKGROUND OF THE INVENTION

This application is a continuation-in-part of application Ser. No. 231,379, filed Aug. 12, 1988 for a SUPPORT STAND.

The invention is in the field of engineering structures and other practical implementations of a construction technique using a 3-dimensional lattice of beams which are notched at the joint regions such that they interlock with one another to form rigid joints without the need for fasteners or adhesives.

The subject matter of this patent represents advances in the general technique set forth in U.S. Pat. Nos. 4,715,503, 4,809,146 and 4,825,620, and pending patent application Ser. No. 231,379, filed Aug. 12, 1988. The interlocking joint construction was exemplified by a wine rack in the first patent. The second and third patents and the pending application were continuations-in-part of the first patent and dealt with a structural beam, a structure with frame panels, and a support for lamps, tables and the like, respectively.

As the inventor has developed the technique, other implementations for heavier construction structures have been developed. Because there is basically no limitation on the types of material from which the constituent members can be made, virtually any support structure that is currently constructed from wood, precast concrete, steel or other metallic materials, or plastics/composites could be replaced with an equivalent construction utilizing the interlocking joint technique disclosed herein and in the above-referenced disclosures.

Pultruded polymer matrix composites are a promising field in which very strong, light-weight members could be machine-produced efficiently. These members could be made in various diameters and notch spacings for assembly into temporary supports such as scaffolding, or used as reinforcement for concrete in the place of currently used steel bars to eliminate rebar rusting problems and strengthen reinforcing member intersections.

SUMMARY OF THE INVENTION

The instant invention addresses the structural supports that can be made with the interlocking joint, and specific improvements to the details of construction are also set forth.

Although no doubt some limitations exist on the types of structures that can be built with the instant technology because of special requirements, nonetheless probably tens of thousands of applications could easily be accommodated by the disclosed construction techniques. Two exemplary structures are a equipment support structure and a bridge. These configurations are exemplary in that a structure is required to take heavy compressive loads and resist torsional forces, whereas a bridge is exemplary of a spanning structure. Other examples of structural configurations include temporary support structures for tunnels, the use of composites to reinforce concrete, solid wall and fence construction, and retaining walls.

Improvements to the details of construction include diagonal bracing with or without positive detents, a radiused configuration of the joint notches and the edges of the elongated members to eliminate stress risers, the use of a short single-joint locking key for the sixth member rather than a longer member which passes through more than one joint, and a tapered configuration of the elongated members in which inter-joint spans would be narrowed, which would be useful in instances in which weight minimization is a significant design criterion.

BRIEF DESCRIPTION OF THE DRAWINGS

FIG. 8 is a side elevation view of a cell face with diagonal support braces;

FIG. 9 is an exploded perspective detail illustrating the lap joint construction of crossing braces;

FIG. 10 is a perspective view which illustrates a radiused notch and radiused-edged elongated members;

FIG. 11 is a side elevation view of a modified joint using a shortened key member;

FIG. 12 illustrates an elongated member pair which is tapered between joints to reduce weight;

FIG. 13 is a perspective view which illustrates a radiused notch and radiused-edged elongated members;

FIG. 14 is a perspective view similar to FIG. 10 but illustrating notches radiused at 50% of member width resulting in the use of dowels for the elongated members;

FIG. 18 is a front elevation view of a retaining wall in place;

FIG. 19 is a section taken through the wall in place, with portions broken away;

FIG. 20 is a top plan view of the wall as seen in FIG. 19 but with the earth omitted; and, FIG. 21 is a section taken along 21—21 of FIG. 19, with the earth removed.

DETAILED DESCRIPTION OF THE PREFERRED EMBODIMENT

Figure 1:
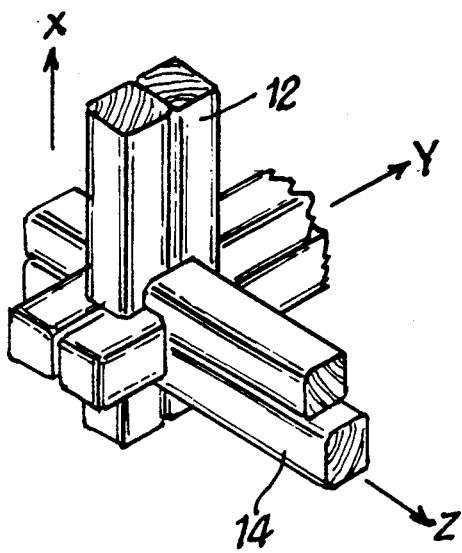
FIG. 1 is a perspective view of a typical interlocking joint with radiused members.
Figure 2:
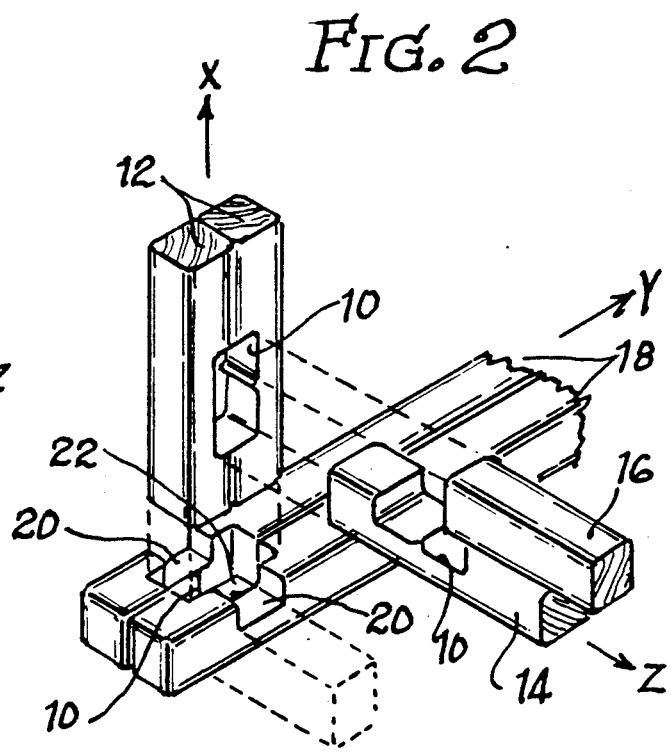
FIG. 2 is an exploded perspective of the joint of FIG. 1.

The notch construction is detailed in the disclosures noted in the Background of the Invention. Each joint is made of 6 elongated members as shown in FIGS. 1 and 2. These members form member pairs, each of which extends orthogonally from each of the other member pairs in the illustrated embodiment. The orthogonal joint is the easiest and the most logical type, but its use is not dictated by the construction. In other words, the X, Y, and Z axes need not be orthogonal as shown in FIGS. 1 and 2, and the members need not be square in cross-section. One of the axes could lean in less than 90 degrees in one direction, and the notches and elongated members could be diamond shaped or rectangular. However, for simplicity and ease of description, only the orthogonal embodiment is illustrated herein.

Five of the six elongated members have a full notch 10 cut in them. This is the only notch in the members 12 of the X-directional pair and the member 14 which passes under the key member 16 in the Z direction. The Y-directional members 18 have an additional notch 20 cut through them as indicated in FIG. 2. The second notch intersects the first notches as shown. Of course, the X-, Y-, and Z-directions are arbitrarily oriented with respect to most of the structures in which they are oriented, and any of the three alternative orientations would work equally well. The configuration chosen could be non-arbitrary if superior joint strength in one dimension is desired, in which the least-notched direction would require that orientation. Also, in some configurations, the key post, which is not notched and slips into the joint to rigidify it, may need to be inserted at a particular one of the orthogonal orientations to facilitate final assembly.

In FIGS. 1 and 2, all external edges are radiused at 11, and all notches have a corresponding radius 13, with the full notches 10 having a central, raised ridge 15 to fill the gap that would otherwise be produced between the radiused edges of the adjacent members of a member pair passing through the respective notch. Internal and external radii mate such that there are no voids in the joint except for the parallelopiped void 22, which is inherent in the notch configuration in the preferred embodiment. The void 22 could itself be filled with wood or epoxy, if desired.

Assembly of the joint can be visualized by inspecting FIG. 2. With the members 18 together as shown in the Figures, the members 12 are passed down through the opening in the members 18. When the opening in the members 12 is below the members 18, member 14 is passed through members 12, with the latter being raised to seat the notch of the member 14 in embracing relation with the members 18. The key post 16, having no notches, is inserted through the members 12 to form the rigid joint of FIG. 1.

Figure 4:
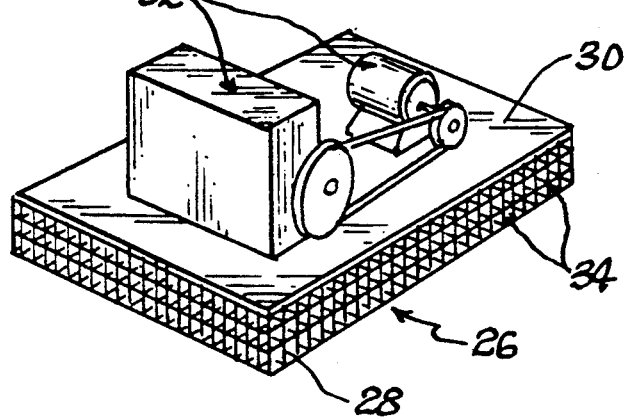
FIG. 4 is a perspective view of an equipment support structure implementation of the invention.
Figure 5:
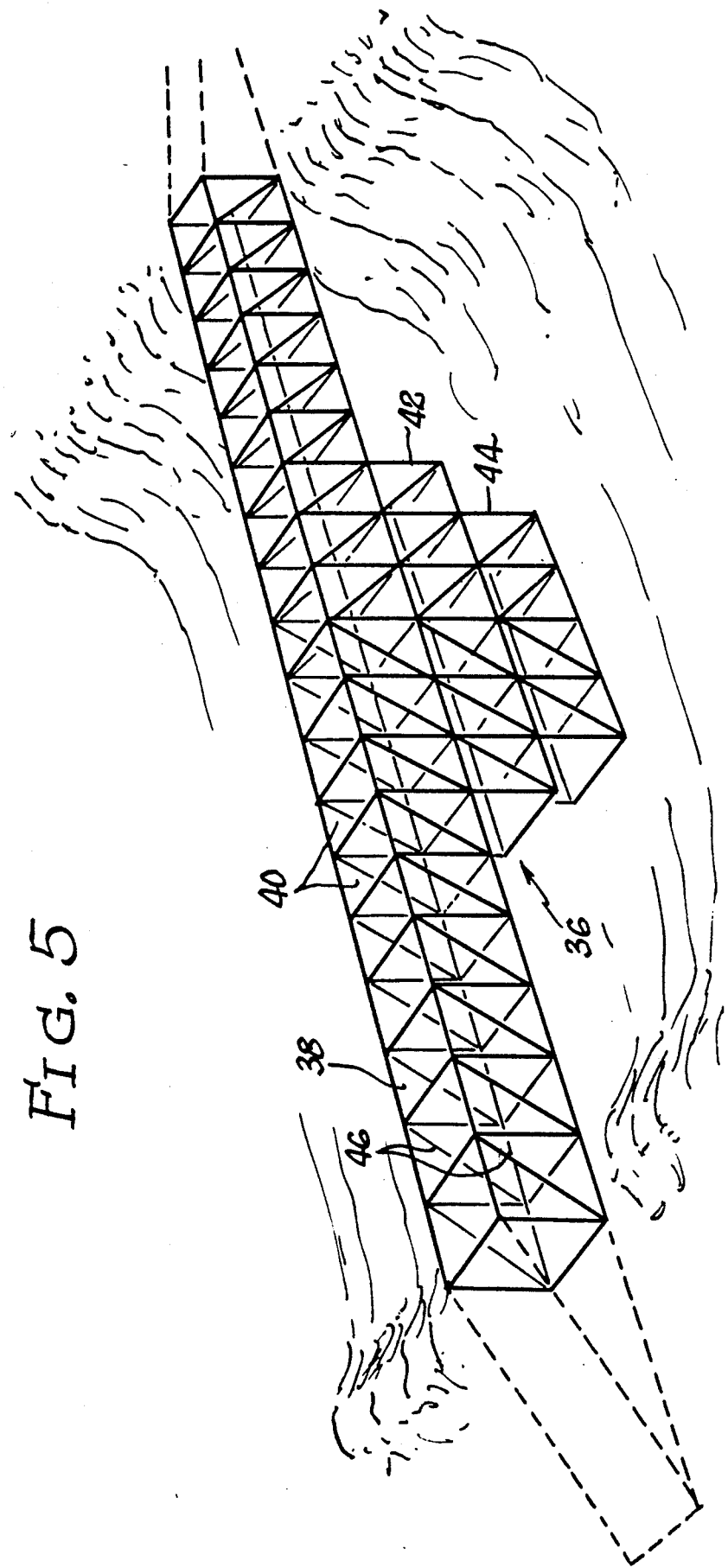
FIG. 5 is a perspective view of a bridge implementation.
Figure 6:
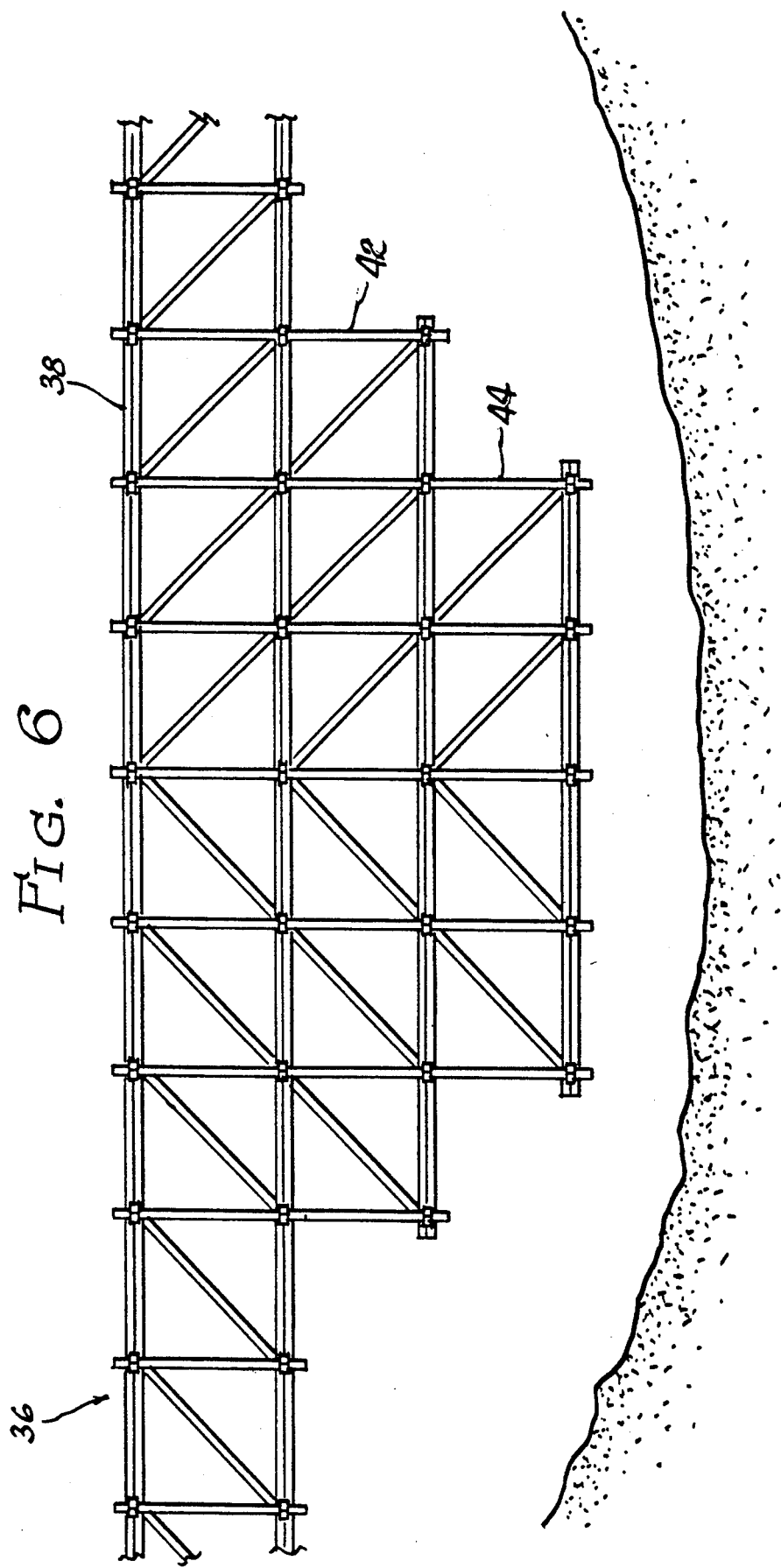
FIG. 6 is a side elevation view of the bridge of FIG. 5.
Figure 7:
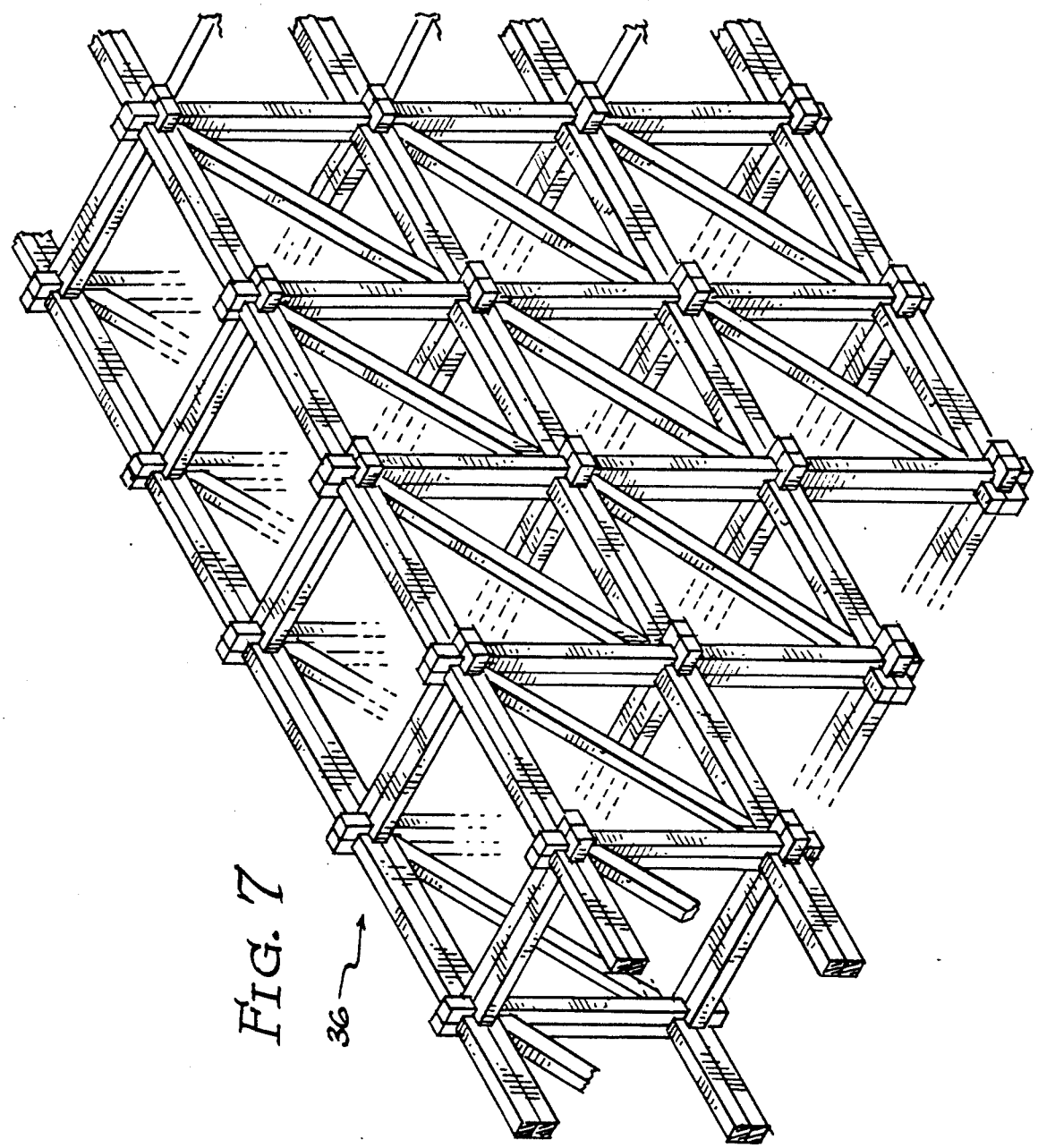
FIG. 7 is a perspective view of a detail of the bridge of FIGS. 5 and 6.

Any of the members of the joint of FIGS. 1 and 2 can be extended out to participate in the formation of one or more additional joints. For example, in FIG. 4, an equipment support structure 26 is formed four joints deep and a multiplicity of joints wide and long. The lattice 28 which forms the body of the joint defines a flat planar support surface on top which is covered by a panel 30 of any rigid flat plate material, which can be used to support any kind of weight and equipment, illustrated at 32 in FIG. 4. Normally some type of fasteners or adhesive would be used to bond the panel 30 to the underlying lattice 28, but this interface does not require tremendous strength, as most to the other members of the cells, provided they will stay in place. Thus a light friction fit could be used to avoid any fastening structure altogether. In the event there is concern that the diagonals would either be jostled out of place or removed by vandals, detent structure could be used, such as the frictionally swivelable ears 48 shown in FIGS. 8 and 9. These ears straddle a single member and can be rotated into place around a single member as shown at the top and bottom of FIG. 8, and away from the members presenting a double face as are the verticals in FIG. 8.

The ears 48 are a simple and low cost means of providing a positive engagement of the braces in the cell faces in which they reside. However, this construction is not particularly vandal resistant, nor can the braces be snapped into place. Spring-loaded ball detents or the equivalent could be used for snap-in, snap-out construction, and spring-loaded pins which engage in mating sockets could be used for snap-in, permanent installation.

Only one diagonal brace would be needed if the stress on the structure is in only one direction such that the brace would be in compression. However, if oppositely directed forces would be experienced which would tend to put the brace in tension, a second brace could be inserted orthogonally to the first. If the braces were narrow, or were inserted in separate faces, they could be inserted into the cell without being adapted to accommodate the other brace. If they are the same size as the other members however, they would need some kind of lap joint construction as indicated at 50 in FIG. 9 so that the braces could lie in the same plane.

Other details of construction are illustrated in the remaining Figures. FIG. 10 illustrates a notch which has a radius 13 in the corners requiring that the interfitting elongated member be provided with a radius 11 of approximately the same dimension. Radiused notches are also shown in FIG. 13. The radiused construction is advantageous in that it reduces the stress concentration that a sharp corner produces. In the case of pultruded composites, the member edge radius would add no cost to the product, as the profile would be incorporated into the die used to pultrude the shapes.

The radius would ordinarily be within the range of 20% to 30% of the width of the members, which would greatly reduce the stress at the edges of the notches and the members. A radius of 50% might be used, however, resulting in semi-circular notch configurations and the use of circular rods as the elongated members as shown in FIG. 14. This configuration would result in some sacrifice of strength due to the reduction in mass of the members, but might be useful in some constructions as stock rods could be easily semi-cylindrically notched.

FIG. 11 illustrates a configuration in which the elongated key members 16 are replaced with short pegs 56. Where the strength of a continuous key is not required, construction can be simplified by the use of short key pegs to eliminate having to force a long member through a series of openings which must be aligned as the key is passed through. If there is a need for a positive restraint for the peg, some kind of retaining ramps, pins or other devices could be used.

Figure 3:
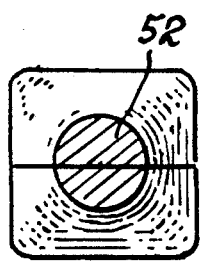
FIG. 3 is a section taken along line 3—3 of FIG. 12.

Because five of the members are notched at the joints to eliminate half of their cross-sectional material, the members are considerably stronger between the joints. This results in there being an excess of strength and weight in the members between the joints, inasmuch as the collapse of any structure under increasing force will occur at the joints anyway. Thus if the construction is such that weight is an important design criterion and cost plays a lesser role, the members can be tapered between the joints as shown in FIGS. 3 and 12. Although FIG. 3 shows the inter-joint region 60 to be tapered to a circular cross section 52 for a member pair, clearly this could be rectangular rather than circular so that the tapering could be accomplished by a sawcut rather than requiring a lathe.

The construction detailed herein has a number of advantageous features. One of these is the high strength-to-weight ratio. The ability to use any kind of construction material would be important in some applications. Composite plastics which are difficult to join with cement or chemical welding are perfect for interlocking construction. Although wood is the most obvious material, metallic members of steel or aluminum could be used. The use of high-strength, pre-cast concrete members holds considerable promise. Pre-cast concrete be easily assembled at a construction site where temporary shoring is needed to assist construction of subways, tunnels or bridges with the joints rigidified by a steel box beam as the key member.

Figure 15:
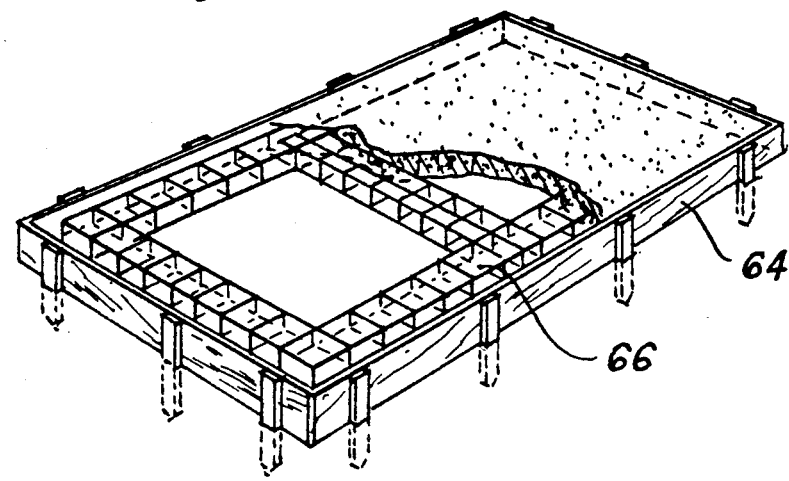
FIG. 15 is a diagrammatic view of a concrete slab using interlocking members for reinforcement.

FIGS. 15 through 21 illustrate four other structural implementations of the invention. In FIG. 15, the grid structure is used to reinforce concrete. As in a typical poured concrete configuration, formboards 64 are supported around the perimeter of the concrete to be formed. an infinite variety of interlocking shapes could be used to reinforce the concrete. The one shown in FIG. 15 is a square figure 8, indicated at 66. This configuration is only exemplary, but would provide resistance to expansion in both the orthogonal directions.

The reinforcing configuration of FIG. 15 is significant because although steel could be used as is done currently, virtually any other material could be used as well. For example, plastic composites, which are extremely strong, could be used to replace the universally used steel reinforcing bar. Because composites will not rust or corrode, there is a substantial possibility that concrete structures reinforced with composites would last two or three times as long. This could be a significant advance in structural concrete techniques inasmuch as the concrete infrastructure of the country is rapidly deteriorating, largely due to the fact that moisture seeps through the porous concrete, rusting the rebar, with the result that the rebar swells, cracking the concrete, and becoming weaker. Damage experienced in the recent San Francisco earthquake revealed that concrete broke along rebar lines, and the rebar joints pulled apart, as the joints are connected only by steel with relatively weak joining means.

Figure 16:
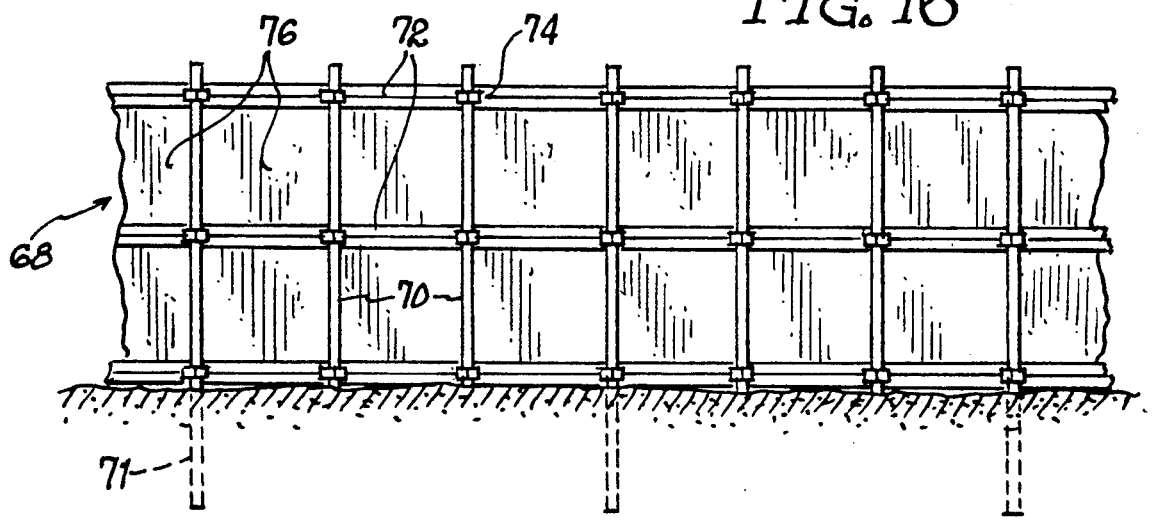
FIG. 16 is a front elevation view of a solid wall or fence using the interlocking construction.

Another configuration is a wall 68, shown in FIG. 16. This is a free-standing wall, with vertical elongated members 70 extending down into the soil at 71. The horizontal cross members 72 define planar cells with the vertical members, and short members 74 finalize the joints.

The construction of the wall of FIG. 16 with the joints at the corners of the two-dimensional cells is such that a natural seat is provided for a rectangular panel over the face of each cell. The seat will prevent motion of the panel up, down, left or right, permitting displacement only perpendicularly away from the wall. Any fasteners which will secure the panel against this displacement can be used.

In a modified form of the wall of FIG. 16, which is shown in FIG. 18, nothing need be used to hold the panels 76 in place other than temporarily, inasmuch as the wall is used as a retaining wall, and the soil 78 of the bank to be retained will naturally hold the panels in place with considerable force. The wall in FIGS. 18 through 21 differs from the wall 68 in FIG. 16 principally in that in addition to the horizontal and the vertical members which form the planar cells, the orthogonal members 74 do not all terminate as shown in FIG. 16, but extend rearwardly as shown at 80, deep into the soil bank to act as anchors. An additional joint 82 may be formed at the embedded at the end of each of the members 80 to act as anchor masses. Ordinarily, it would not be necessary to extend each of the anchor members 74 back to act as anchors. In the illustrated embodiment, shown in FIG. 21, a staggered pattern is created in which every fourth one of the member pairs in a horizontal row extends into the soil bank.

Figure 17:
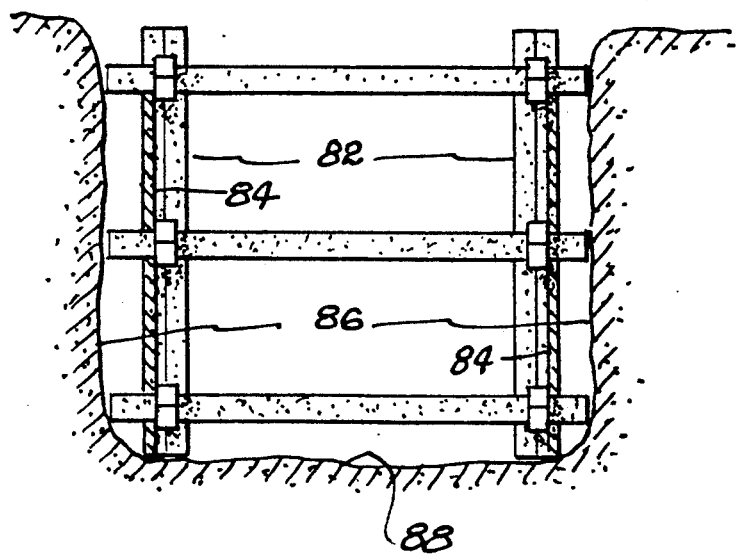
FIG. 17 illustrates an implementation of the construction in which the sidewalls of a tunnel or trench are retained, temporarily or permanently.

The configuration of FIG. 17 is very similar to that of FIG. 16, except that two walls 84 are spaced apart and maintained rigidly separated by connecting members 74 at appropriate joints to adequately support opposed banks 86 of the trench or tunnel 88. A third wall could be put atop the first two walls, or across the bottom, or both, so that a completely enclosed square tube is provided, open only at the ends.

In all of the wall configurations FIGS. 16 through 21, wooden beams could be used for the elongated members. However, these configurations lend themselves ideally to the use of pre-stressed concrete members which could be assembled on-site for a concrete scaffolding, or retaining wall structure, either permanent or for temporary use. By providing the structural members in lengths of at least one-and-one-half the width of a cell, great latitude is provided in the dimensioning selectable for the various configurations. Obviously, the joint between any two of the adjoining elongated members would be removed at least one cell from the joint in the other member of the pair so that weak spots would not be created.

The use of the panels 76 serve a strengthening role as well as serving to block soil and as a barrier in the case of a free-standing wall. Especially if they are made of concrete, they provide tremendous reinforcement against stresses in the plane of the wall. They would more than adequately replace the diagonal braces described above.

Perhaps the greatest advantages of all, however, are the ease and simplicity of construction of many types of structures, the ease of disassembly of the structure, and the compact stowage of the building materials for storage and transport. These features are particularly important in certain applications, for example military bridges. A temporary bridge can be transported on-site in a very compact and relatively light-weight form, and assembled with no tools at all. (The bridge illustrated herein defines a flat support plane but does not provide a support surface, and would require additional support beams and probably flooring panels to cover the top to make a road surface).

With these known advantages, there would seem to be no practical limit in the applications in which this construction technique can be incorporated.

I claim:

1. A multi-celled support lattice comprising:
   (a) a plurality of adjacent cells defining a support surface;
   (b) each of said cells having twelve edges and each edge being defined by a pair of elongated structural members, with each cell sharing common member pairs with any adjacent cells;
   (c) each of said cells having eight corner joints, each being defined by the intersection of three interlocking structural member pairs;
   (d) said joints each defining X, Y, and Z directions and comprising:
      (i) said elongated structural member pairs being formed into an X-directional parallel contiguous pair, a Y-directional parallel contiguous pair, and a Z-directional parallel contiguous pair;
      (ii) said parallel contiguous pairs intersecting one another to define said joint between said six elongated structural members such that said joint has:

(1) three elongated structural members that are each only full notched to define a full notch, said full notch being of length substantially equal to twice the thickness of said structural members and of depth substantially equal to half the thickness of said structural members such that when paired with an oppositely-directed full-notched member a pass-through opening is defined which will snugly fit a pair of members inserted orthogonally therethrough;

(2) two of said members having similar full notches and also having an additional half notch, said half notch being formed at 90 degrees to the full notch and substantially at mid-span of the full notch; and, (3) the sixth elongated structural member having no notches at said joint and being the key post that holds the remaining five members together as a joint; and, (iii) said joint comprising an interlocking joint held together by the interlocking configurations of the elongated structural members themselves such that said lattice is rigid without the use of fasteners at the joints.

2. Structure according to claim 1 wherein said surface is planar.

3. Structure according to claim 2 wherein said lattice is multicellular in each of the X, Y, and Z directions and defines a parallelopiped with said support surface on top.

4. Structure according to claim 2 wherein said lattice is elongated and defines means at the opposite ends thereof to support itself such that said lattice can be used as a bridge surface support.

5. Structure according to claim 4 wherein said bridge is defined by a principal row of cells defining a plane on top, and a plurality of additional support cells defined vertically adjacent said principal row.

6. Structure according to claim 5 wherein said support cells comprise a second row of cells vertically adjacent at least a portion of said principal row.

7. Structure according to claim 6 wherein said second row is shorter than said principal row and is centered at the vertical center plane of said principal row.

8. Structure according to claim 7 and including a third cell row shorter than and adjacent to said second row and on the side thereof opposite said principal row.

9. Structure according to claim 8 wherein said second and third rows are defined beneath said principal row.

10. Structure according to claim 4 and including a plurality of diagonal braces for at least some of said cells.

11. Structure according to claim 1 wherein said cells each defines six face planes and at least some of said face planes include a diagonal brace passing between the diagonally opposite corners of the respective face.

12. Structure according to claim 10 wherein said diagonal braces have V-shaped ends to conform to the surfaces of said interlocking member pairs.

13. Structure according to claim 12 wherein at least some of said braces have detent structure to prevent their accidental dislodgement from the respective cell face.

14. Structure according to claim 13 wherein at least some of said diagonal braces are configured as brace pairs passing across one another substantially centrally of the respective cell face.

15. Structure according to claim 14 wherein each of the braces in a brace pair is centrally lapped and jointed to the other brace in the respective brace pair.

16. Structure according to claim 1 wherein at least some of said elongated structural members have thicker joint-defining portions and are thinned along regions between said joint-defining portions.

17. Structure according to claim 16 wherein said elongated structural members are smoothly tapered between said joint-defining portions and the thinned inter-joint portions.

18. Structure according to claim 1 wherein at least some of said key posts do not span between joints but are long enough to pass through a joint to rigidify same.

19. Structure according to claim 1 wherein each of said notches is radiused at the corners and each of said elongated members is radiused along at least some of its edges.

20. A multi-celled support lattice comprising:

(a) a plurality of adjacent cells;

(b) each of said cells having twelve edges and each edge being defined by a pair of elongated structural members, with each cell sharing common member pairs with any adjacent cells;

(c) each of said cells having eight corner joints, each being defined by the intersection of three interlocking structural member pairs;

(d) said joints each defining X, Y, and Z directions and comprising:

(i) said elongated structural member pairs being formed into an X-directional parallel contiguous pair, a Y-directional parallel contiguous pair, and a Z-directional parallel contiguous pair;

(ii) said parallel contiguous pairs intersecting one another to define said joint between said six elongated structural members such that said joint has:

(1) three elongated structural members that are each only full notched to define a full notch, said full notch being of length substantially equal to twice the thickness of said structural members and of depth substantially equal to half the thickness of said structural members such that when paired with an oppositely-directed full-notched member a pass-through opening is defined which will snugly fit a pair of members inserted orthogonally therethrough;

(2) two of said members having similar full notches and also having an additional half notch, said half notch being formed at 90 degrees to the full notch and substantially at mid-span of the full notch;

(3) the sixth elongated structural member having no notches at said joint and being the key post that holds the remaining five members together as a joint; and, (iii) said joint comprising an interlocking joint held together by the interlocking configurations of the elongated structural members themselves such that said lattice is rigid without the use of fasteners at the joints;

(e) each of said notches being radiused at the corners and each of said elongated members being radiused along at lease some of its edges.

21. Structure according to claim 20 wherein substantially all of said members have radiused edges of a set radius and substantially all of said notches have radii equal to said set radius.

22. Structure according to claim 21 wherein substantially all of said members are of uniform thickness and said radius is between 15% and 30% of said thickness.

23. Structure according to claim 22 wherein said full notches each has a central raised ridge to fill the gap defined between the radiused edges of a pair of members passing through the respective full notch.

24. Structure according to claim 21 wherein substantially all of said members are of uniform thickness and said set radius is 50% of said thickness such that said members are dowels circular in cross-section.

25. A wall comprising:
(a) a plurality of adjacent substantially 2-dimensioned cells defining a substantially planar surface;
(b) each of said cells having four edges and each edge being defined by a pair of elongated structural members, with each cell sharing common member pairs with any adjacent cells to define a substantially 2-dimensional lattice;
(c) each of said cells having four corner joints, each being defined by the intersection of three interlocking structural member pairs;
(d) said joints each defining X, Y, and Z directions and comprising:
  (i) said elongated structural member pairs being formed into an X-directional parallel contiguous pair, a Y-directional parallel contiguous pair, and a Z-directional parallel contiguous pair;
  (ii) said parallel contiguous pairs intersecting one another to define said joint between said six elongated structural members such that said joint has:
    (1) three elongated structural members that are each only full notched to define a full notch, said full notch being of length substantially equal to twice the thickness of said structural members and of depth substantially equal to half the thickness of said structural members such that when paired with an oppositely-directed full-notched member a pass-through opening is defined which will snugly fit a pair of members inserted orthogonally therethrough;
    (2) two of said members having similar full notches and also having an additional half notch, said half notch being formed at 90 degrees to the full notch and substantially at mid-span of the full notch; and,
    (3) the sixth elongated structural member having no notches at said joint and being the key post that holds the remaining five members together as a joint; and,
  (iii) said joint comprising an interlocking joint held together by the interlocking configurations of the elongated structural members themselves such that said lattice is rigid without the use of fasteners at the joints;
(e) a plurality of panels, each substantially covering a respective one of said cells, such that at least a portion of said lattice is a solid wall.

26. Structure according to claim 25 wherein said cells extend in the X-direction, and the Y-direction, and the elongated members extending in the Z-direction are short members being long enough to pass through and securely interlock the respective joints but too short to span between two joints.

27. Structure according to claim 26 wherein one of said short members in each of said joints comprises the key post for the respective joint.

28. Structure according to claim 26 wherein said elongated members define positive seats for said panels by surrounding said panels on all four sides to secure same against all movement except perpendicular movement away from said wall.

29. Structure according to claim 26 wherein said cells have substantially vertical elongated members which extend below said panels and anchor said wall in the earth.

30. Structure according to claim 26 wherein said cells extend in the X-direction and the Y-direction, and at least some of said member pairs extending in the Z-direction comprise anchor posts to imbed in the earth of a bank to be retained.

31. Structure according to claim 30 wherein at least some of said anchor posts define one of said joints therealong spaced from the plane of said cells to define anchor masses.

32. Structure according to claim 26 wherein said wall is a first wall and is substantially duplicated by a second wall parallel from said first wall and spaced therefrom by elongated member pairs extending orthogonally with respect to said walls, and said walls and said walls are substantially vertical to support the earthen sidewalls of a tunnel or the like.

33. Structure according to claim 32 and including a third wall extended across the tops of said first and second walls to define an overhead support for a tunnel or the like.

34. Structure according to claim 33 and including a further wall defining a substantially horizontal floor spanning between the bottom edges of said first and second walls.

35. A concrete reinforcing structure to be imbedded in wet concrete comprising:
(a) a plurality of intersecting elongated member pairs interlocking at the intersections to define joints;
(b) said joints each defining X, Y, and Z directions and comprising:
  (i) a plurality of elongated structural member pairs formed into an X-directional parallel contiguous pair, a Y-directional parallel contiguous pair, and a Z-directional parallel contiguous pair;
  (ii) said parallel contiguous pairs intersecting one another to define said joint between said six elongated structural members such that said joint has:
    (1) three elongated structural members that are each only full notched to define a full notch, said full notch being of length substantially equal to twice the thickness of said structural members and of depth substantially equal to half the thickness of said structural members such that when paired with an oppositely-directed full-notched member a pass-through opening is defined which will snugly fit a pair of members inserted orthogonally therethrough;
    (2) two of said members having similar full notches and also having an additional half notch, said half notch being formed at 90 degrees to the full notch and substantially at mid-span of the full notch; and, (3) the sixth elongated structural member having no notches at said joint and being the key post that holds the remaining five members together as a joint; and, (iii) said joint comprising an interlocking joint held together by the interlocking configurations of the elongated structural members themselves such that said lattice is rigid without the use of fasteners at the joints.

36. Structure according to claim 35 wherein said interlocking elongated member pairs define a plurality of contiguous cells having twelve edges and eight joints.

37. Structure according to claim 36 wherein said cells are parallelopipeds.

* * * * *